United States Patent
Carlsson

(10) Patent No.: US 7,798,243 B2
(45) Date of Patent: Sep. 21, 2010

(54) VEGETATION CUTTER

(76) Inventor: Jonas Carlsson, Lösen 136, S-371 94 Lyckeby (SE)

(\*) Notice: Subject to any disclaimer, the term of this patent is extended or adjusted under 35 U.S.C. 154(b) by 0 days.

(21) Appl. No.: 11/996,058

(22) PCT Filed: Jul. 14, 2006

(86) PCT No.: PCT/SE2006/000888

§ 371 (c)(1),
(2), (4) Date: Jan. 17, 2008

(87) PCT Pub. No.: WO2007/011288

PCT Pub. Date: Jan. 25, 2007

(65) Prior Publication Data

US 2008/0196909 A1 Aug. 21, 2008

(30) Foreign Application Priority Data

Jul. 18, 2005 (SE) .................................. 0501679

(51) Int. Cl.
*A01B 49/04* (2006.01)
(52) U.S. Cl. .................. 172/27; 172/900; 172/720; 172/772.5; 172/733
(58) Field of Classification Search .................. 172/27, 172/28, 720, 900, 772.5, 723, 733, 685, 691; 56/289, 314, 233, 121.41, 121.43, 121.46, 56/127, 237
See application file for complete search history.

(56) References Cited

U.S. PATENT DOCUMENTS

| 794,361 | A | * | 7/1905 | Lambson | 172/387 |
| 820,820 | A | * | 5/1906 | Nolen | 172/475 |
| 1,011,455 | A | * | 12/1911 | Lowe | 172/421 |
| 1,062,374 | A | * | 5/1913 | Taff | 172/387 |
| 1,111,908 | A | * | 9/1914 | Kline | 172/462 |
| 1,404,313 | A | * | 1/1922 | Olander | 172/429 |
| 1,521,503 | A | | 12/1924 | Bruinekool | |
| 1,538,724 | A | * | 5/1925 | Mills | 172/720 |
| 1,583,063 | A | | 5/1926 | Mankel | |
| 1,635,098 | A | | 7/1927 | Saunders | |

(Continued)

FOREIGN PATENT DOCUMENTS

GB 613764 12/1948

*Primary Examiner*—Robert E Pezzuto
*Assistant Examiner*—Matthew D Troutman
(74) *Attorney, Agent, or Firm*—Dickstein Shapiro LLP

(57) ABSTRACT

A vegetation cutter intended to mechanically separate vegetation, such as control of e.g. control weeds and/or other undesired crops or vegetation from desired crops or vegetation on a land surface. Said vegetation cutter is movable during use in a direction through the vegetation at the same time as it comprises a number of knife devices arranged in a distance from each other, each knife device having at least one cutting function working in or towards said distance, the stems of said vegetation in cross section have various thickness or diameters, such as coarser thickness, mainly constituting the weed and/or the undesired crops, said vegetation also having narrower thickness or diameters mainly constituting desired crops or vegetation and said distance on at least some place being shorter than the coarser thickness or the diameters at least at that place, where the cutting function works, so that the cutting function, when it is moved through the vegetation, cuts off or damages the coarser thickness, so that they fade, while the narrower thickness mainly can pass the cutting function without being damaged, so that they remain undamaged and can grow on further.

10 Claims, 3 Drawing Sheets

U.S. PATENT DOCUMENTS

| | | | | |
|---|---|---|---|---|
| 1,667,708 A | * | 4/1928 | Ruzalski | 172/691 |
| 1,747,291 A | * | 2/1930 | Edwards | 172/27 |
| 1,800,152 A | * | 4/1931 | Phillips et al. | 172/720 |
| 1,855,820 A | * | 4/1932 | Bowman | 172/687 |
| 2,371,718 A | | 3/1945 | Speck | |
| 2,514,338 A | | 7/1950 | Roberts | |
| 2,677,321 A | * | 5/1954 | Ferguson | 172/152 |
| 2,706,437 A | * | 4/1955 | Sanders | 172/57 |
| 2,770,090 A | | 11/1956 | Borden | |
| 2,818,792 A | * | 1/1958 | Lynch et al. | 172/657 |
| 3,717,984 A | | 2/1973 | Wright | |
| 4,206,814 A | * | 6/1980 | Isaacs | 172/44 |
| 4,588,033 A | * | 5/1986 | Orthman | 171/62 |
| 4,823,884 A | * | 4/1989 | McCall | 172/508 |
| 4,846,284 A | * | 7/1989 | Yost | 172/772.5 |

* cited by examiner

VEGETATION CUTTER

BACKGROUND OF THE INVENTION

The present invention refers to a vegetation cutter intended to mechanically separate vegetation, such as control of e.g. weeds and/or other undesired crops/vegetation from desired crops/vegetation on a land surface, said vegetation cutter comprises a number of knife devices arranged in a distance from each other, each of which has its own cutting function, whereupon the vegetation stems present coarser thickness, which consist of weeds and undesired crops/vegetation, said vegetation also has stems with smaller thickness, which consist of desired crops/vegetation and said distance is smaller than the coarser thickness, so that the cutting function passes through the vegetation, whereupon the weed and the undesired crops/vegetation are cut off by aid of the cutting function or being damaged and over a period of time are fading, while the desired crops/vegetation is passing the cutting function without being damaged and remains to grow on further.

On the market today structures of this kind comprise different mechanical tools in order to control weeds and other undesired crops. These consist of hand tools of the type hoes and cutting tools, where you manually identifies weeds and undesired crops/vegetation, which thereafter is eliminated by the hand tool in the way that the weed/the undesirable crops is pulled up from the land surface or is cut off, which is much time wasting and laborious to do and moreover is not possible to do mechanically. Such a hand tool is shown in the patent specification U.S. Pat. No. 6,213,527, which comprises an U-formed knife to embrace the weed with, so that a claw of the tool holds the weed, whereupon it is eliminated by folding the tool backwards. For mechanically eliminating weeds or undesired crops located over larger land surfaces of arable land mainly chemical pesticides are used today, which burdens the desired crops with poisons, which afterwards is transferred to and damages vegetation, people and animals. Today there are no other effective control methods, which mechanically and effectively eliminate weeds and other undesired crops/vegetation on a larger arable land area.

BRIEF SUMMARY OF THE INVENTION

One object of the present invention is to eliminate the drawbacks mentioned above, by that the vegetation cutter according to the invention comprises a number of knife devices arranged in a distance from each other and having a cutting function, which acts on the coarser thickness of the vegetation, such as weeds and other undesired crops and not on the smaller thickness of the vegetation, such as desired corps. Thus, said distance is smaller than the coarser thickness, so that the desired crops/vegetation passes through the cutting function at the same time as the weed or the undesired crops/vegetation is cut off or becomes damaged and which over a period of time is fading.

Thanks to the invention a vegetation cutter has now been obtained for mechanical control of weeds or other undesired crops, by treating the vegetation containing desired and undesired crops on a land surface by aid of said vegetation cutter. When using the vegetation cutter the same is moved in one direction through the vegetation. According to the invention the vegetation cutter has a number of knife devices arranged in a distance from each other. Each knife device has a cutting function that works towards/in said distance. The vegetation stems have in section different thickness/diameters such as coarser thickness, which mainly is constituting the weed or the undesired crops/vegetation. The narrower thickness are constituting the desired crops/vegetation. The distance between the knife devices is smaller than the coarser thickness at the cutting function, when it passes through the vegetation, so that the cutting function cuts off or damages the weed or the undesired crops/vegetation, while the desired crops mainly passes through undamaged and remains thereby to grow on further. In a preferable embodiment example of the invention the knife device is formed as a long and narrow thin body having elongated sides, which extend mainly in parallel with the moving direction. When moving through the vegetation, the long and narrow bodies extend mainly in parallel with the land surface, with a possible discrepancy on approximately +−30° in relation to the land surface's extension. Said body then is provided with a narrower part in its front end, pointing mainly in the moving direction, so that the movement through the vegetation is facilitated, since a space between the front ends is larger than the distance, counted across the moving direction. According to the invention the knife device can be permanently or adjustable fixed to one or more fixing places. These are in turn permanently or movably provided in a part of a supporting structure, which is adjustable in highs and that has wheels provided against the land surface. The supporting structure can be fixed to a vehicle, as a tractor or other agriculture machine, so that the weed or the undesired crops/vegetation effectively and mechanically can be controlled with small numbers workers on a bigger land surface as on a cultivated arable land. The knife devices have detachable and adjustably fixed knife blades having a cutting function, so that the same when transported through the vegetation cuts off or damages the weed/the undesired crops/vegetation in a predetermined and adjustable cutting angle in relation to the moving direction. In the preferred embodiment example the fixing locations are provided via braces in the structure, so that one end of the braces is provided in the carrying structure and its other end constitutes the fixing locations. The braces then extend mainly in a vertical direction, so that these are adjustable in highs in relation to the land surface and are turnable around their own axis. The elongated sides are then provided near each other in an increased number, so that they form a comb like appearance, so that the knife devices together looks like teeth in a comb and that the distance between teeth corresponds to the distance between the knife devices. In this embodiment example the knife blade has a knife blade form of the type "carpet knife/wallpaper knife" but can also be constituted of a round rotating disc with at points located projections in its periphery area such as saw teeth. The cutting function can also be constituted of strings/threads made of steel or plastic, which are stretched in at least two points or rotary fixed in one of its ends. In the preferred embodiment example the distance and space, the cutting angle and the knife devices' distance from the land surface adjustable via an adjusting equipment of mechanical/electronic/hydraulic type which can be reached by an user. According to the invention the adjustment equipment can be controlled by the user via a processor/computer, which can be programmed with optimal values adapted to different types' of vegetation, so that the vegetation cutter can adapt the function optimally, electronically and mechanically to control various types' of weeds or other undesired crops/vegetation in various types' of vegetations. The greatest advantages with the invention are thus, that a vegetation cutter has been provided, which automatically first can mechanically separate weeds/undesired crops/vegetation from the vegetation and then mechanically remove this in a cheap, effective and simple way with a small number of workers. Moreover, the invention can in a perfect way be used to remove the weed/the undesired crops/vegetation on larger land surfaces mechanically by the aid of pulling/pushing vehicles. This is done completely without pesticides, whereupon the desired crops is not exposed for environment poison.

BRIEF DESCRIPTION OF THE DRAWINGS

The invention is described more in detail with help of some preferred embodiment examples during reference to the attached drawings.

DETAILED DESCRIPTION OF THE INVENTION

Figure 1:
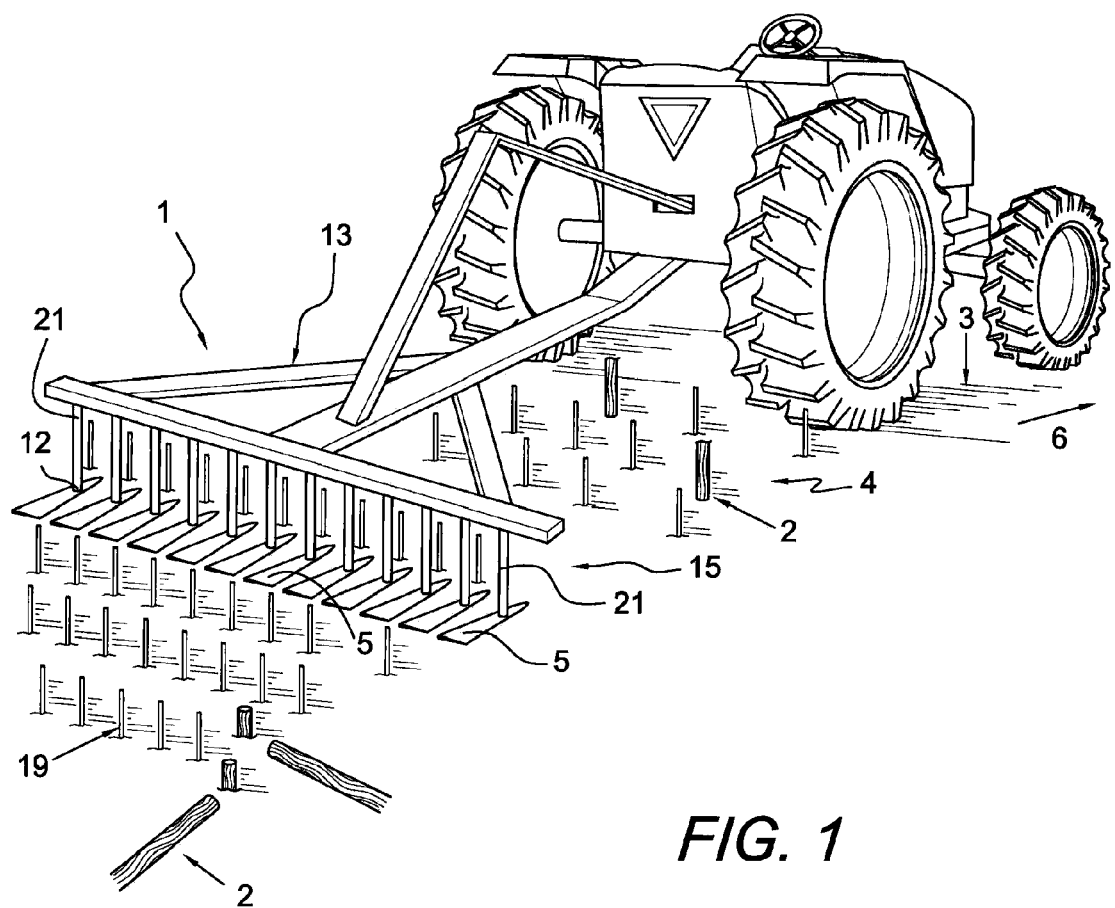
FIG. 1 shows a perspective view of a vehicle, which is transporting the vegetation cutter over a land surface with vegetation.
Figure 2:
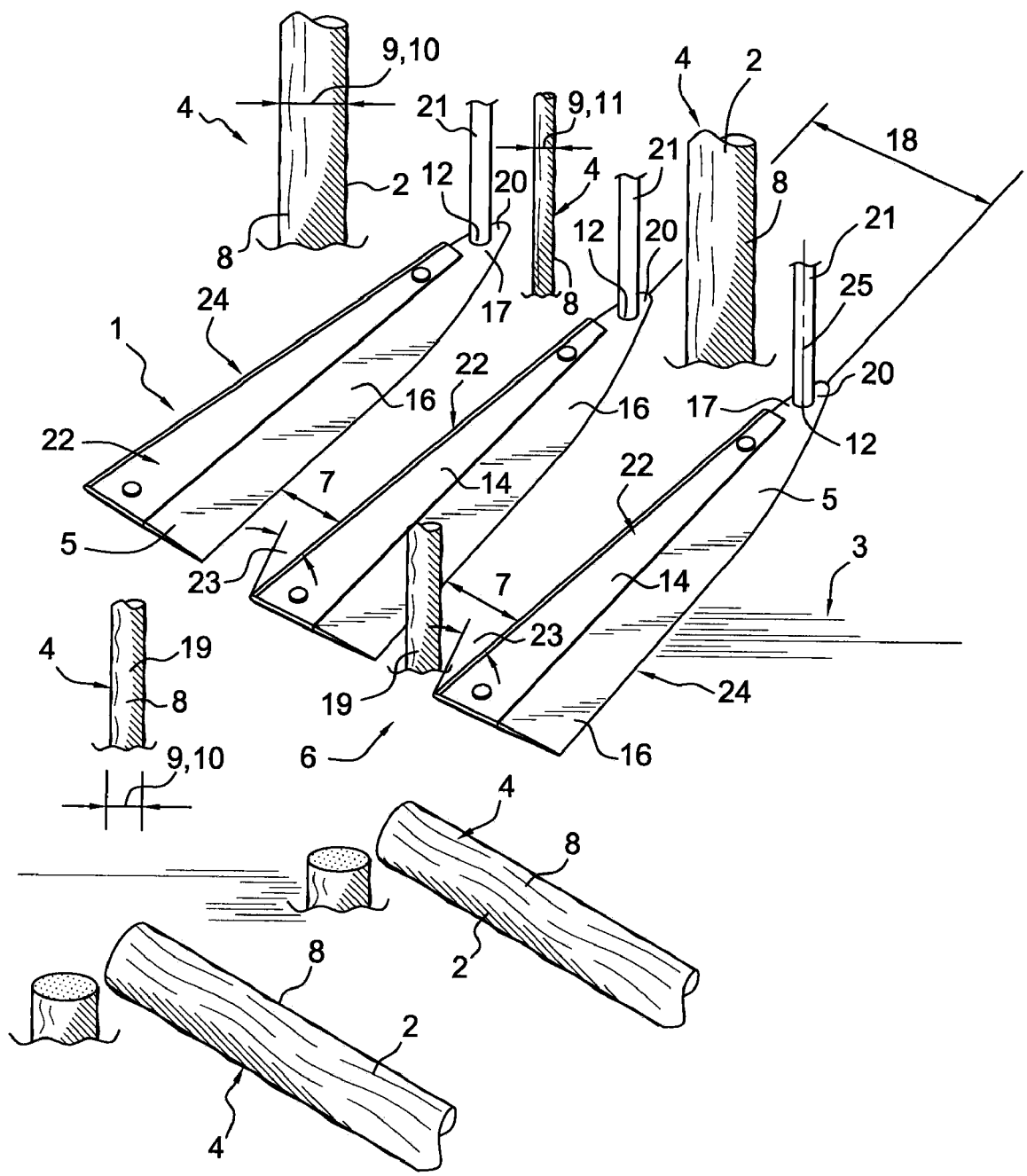
FIG. 2 shows a larger view in perspective of a part of a vegetation cutter, which separates vegetation on a land surface and is cutting off or damages the weeds and undesired crops.
Figure 3:
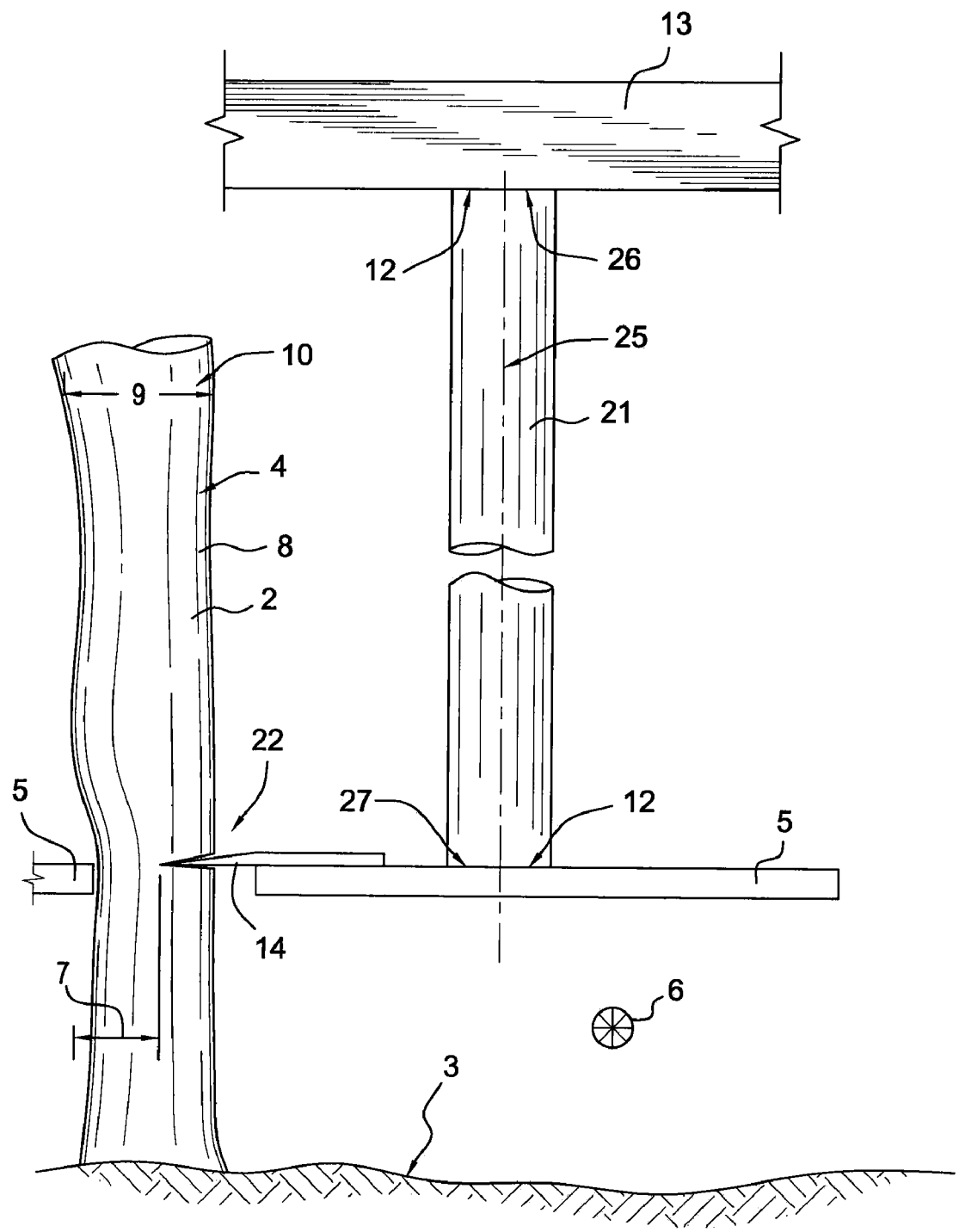
FIG. 3 shows a side view of a part of a brace with a knife device fixed in a supporting structure, which is cutting in a weed/an undesired crops, seen the movement direction.

A vegetation cutter 1 is illustrated in FIG. 1 and partially also in FIGS. 2 and 3, which is intended to mechanically separate vegetation 4, such as weeds 2 or other undesired crops/vegetation from desired crops 19 on a land surface 3. The vegetation cutter 1 is moved in a moving direction 6 through the vegetation 4. The vegetation cutter 1 comprises a number of knife devices 5, arranged in a distance 7 from each other.

As can be seen in FIG. 2 and partially in FIG. 3 each knife device 5 comprises a cutting function 22. The stems 8 of said vegetation 4 have in section different thickness 9 or diameters, such as coarser thickness 10 or diameters, which mainly form the weed 2 and/or the undesired crops/vegetation, said vegetation 4 also has smaller thickness 11 or diameters constituting desired crops 19. Each knife device 5 is formed as a long and narrow body 16 with elongated sides 24. The elongated sides 24 are provided next to each other in a greater number, more than 10 pieces, so that they form a comb-like arrangement 15 according to FIG. 1. The long and narrow body 16 has a narrower part 17 in its front end 20. A space 18 between the front ends 20 are larger than said distance 7. The cutting function 22 is constituted by knife blades 14, which, when moved through the vegetation 4, cut in a predetermined cutting angle 23 in relation to the moving direction 6.

As illustrated in FIG. 3 the knife devices 5 are arranged at fixing points 12 via braces 21, so that one end 26 of the braces 21 is provided in the supporting structure 13 and that its other end 27 constitutes fixing point 12 for the knife devices 5. Here the braces 21 are turnable only around their own axes 25.

The invention claimed is:

1. A vegetation cutter intended to mechanically separate undesired crops or vegetation from desired crops or vegetation on a land surface, wherein the vegetation cutter during use is movable in a direction through the vegetation, the vegetation cutter comprising:
a plurality of knife devices each formed as a long and narrow body with elongated sides and arranged in a distance from each other, each knife device having a cutting blade on a first elongated side working in or towards said distance and a non-cutting surface on a second elongated side,
said plurality of knife devices being arranged such that each of the respective first sides of said knife devices are facing the same direction,
said plurality of knife devices affixed to a supporting structure at an angle relative the moving direction such that the first sides of said plurality of knife devices are trailing their respective second sides;
where the vegetation cutter works, so that when the vegetation cutter is moved through the vegetation, vegetation contacts and brushes along the non-cutting surface, and when it reaches the gap formed by the distance between the knife devices, vegetation with a larger thickness is cut off or damaged, so that they fade, while vegetation with a smaller thickness mainly can pass through a gap formed by the distance between the knives without being damaged, so that they remain undamaged and can grow on further.

2. A vegetation cutter according to claim 1, wherein the knife devices extend mainly in parallel to the land surface during the transport through the vegetation, and wherein said long and narrow body comprises a narrower part in its front end pointing mainly in the moving direction in making the transportation through the vegetation easier, since a space between the front ends is larger than the distance between the knife devices counted mainly across the moving direction.

3. A vegetation cutter according to claim 1, wherein each of the knife devices are fixed and/or adjustably arranged to a respective brace, which in turn is fixed or movably arranged to at least one part of the supporting structure, and wherein the brace is fixed or adjustably arranged to the knife device on an end of the knife device.

4. A vegetation cutter according to claim 1, wherein the knife devices comprise detachable and/or adjustably fixed knife blades, whereby the knife blades, during the transportation through the vegetation, cut off or damage the undesired crops or the undesired vegetation in a predetermined and adjustable cutting angle in relation to the moving direction.

5. A vegetation cutter according to claim 3, wherein there are at least 10 knife devices and the elongated sides of the knife devices are arranged next to each other.

6. A vegetation cutter according to claim 5, wherein the braces extend mainly in a vertical direction, whereby at least some of these are adjustable in height in relation to the land surface and/or is turnable around its own axis.

7. A vegetation cutter according to claim 1, wherein the supporting structure to at least some extent is adjustable in height and that it is directly or indirectly fixed to a vehicle, whereby the control of the weed or the undesired crops or vegetation can be done mechanically on larger land surfaces or arable lands.

8. A vegetation cutter according to claim 1, wherein at least one of the following from the group consisting of the distance between the knife devices, the space between the front ends of the knife devices, the cutting angle of the knife devices, and the distance of the knife device from the land surface, is/are adjustable.

9. A vegetation cutter that removes undesired crops from desired crops, comprising:
a plurality of knife devices arranged on a structure with a distance between them, each knife device having a cutting side with a cutting edge and a non-cutting side;
said plurality of knife devices being affixed to the structure at an angle relative a moving direction with the non-cutting sides leading, such that, when the structure is moved in the moving direction, vegetation makes contact with said non-cutting edge prior to contacting said cutting edge,
wherein the distance between the knife devices is, at least at one point, shorter than the diameter of an undesired crop, and larger than the diameter of a desired crop, and wherein a distance between the cutting edge of a first knife device and the non-cutting side of a second knife is greater at a first point along the length of the knife devices than at a second point.

10. A method of removing undesired crops from desired crops, comprising:

moving a structure with a plurality of knife devices affixed thereto across undesired crops of a predetermined first diameter and desired crops of a predetermined second diameter in a direction parallel to the ground, wherein the distance between cutting edges of the knife devices is smaller than the first diameter, and larger than the second diameter, such that the undesirable crops are cut by the knife devices, while the desired crops are uncut by the knife devices, and wherein the knife devices have a cutting side facing one direction and a non-cutting side facing an opposite direction, and wherein the plurality of knife devices are affixed to the structure an angle relative the moving direction such that the cutting side of each of the knife devices trails the non-cutting side.

* * * * *